(12) United States Patent
Thomas et al.

(10) Patent No.: US 7,631,727 B2
(45) Date of Patent: Dec. 15, 2009

(54) SANDWICH STRUCTURE WITH FREQUENCY-SELECTIVE DOUBLE WALL BEHAVIOR

(75) Inventors: Christian Thomas, Hamburg (DE); Martin Wandel, Lentfoehrden (DE)

(73) Assignee: AIRBUS Deutschland GmbH, Hamburg (DE)

( * ) Notice: Subject to any disclaimer, the term of this patent is extended or adjusted under 35 U.S.C. 154(b) by 116 days.

(21) Appl. No.: 11/805,706

(22) Filed: May 24, 2007

(65) Prior Publication Data

US 2007/0292658 A1  Dec. 20, 2007

Related U.S. Application Data

(60) Provisional application No. 60/808,188, filed on May 24, 2006.

(51) Int. Cl.
*E04B 1/82* (2006.01)
*E04B 1/84* (2006.01)
*E04B 1/86* (2006.01)
*E04B 1/74* (2006.01)

(52) U.S. Cl. .................................. 181/288; 181/290

(58) Field of Classification Search ............... 181/288, 181/290, 292, 285, 210; 52/144, 145, 783.1
See application file for complete search history.

(56) References Cited

U.S. PATENT DOCUMENTS

| | | | | |
|---|---|---|---|---|
| 2,192,516 A * | 3/1940 | Cunnington | ............... | 428/158 |
| 2,198,885 A * | 4/1940 | Price | ........................ | 428/70 |
| 3,035,657 A * | 5/1962 | Lemon | ....................... | 181/290 |
| 3,087,570 A | 4/1963 | Watters et al. | | |
| 3,269,484 A * | 8/1966 | Lighter | ....................... | 181/290 |
| 3,412,513 A * | 11/1968 | Gosele | ........................ | 52/144 |
| 4,253,543 A * | 3/1981 | Johansson | ................... | 181/286 |
| 4,705,139 A * | 11/1987 | Gahlau et al. | ............... | 181/290 |
| 4,909,003 A * | 3/1990 | Hennigan | ..................... | 52/144 |
| 5,483,028 A * | 1/1996 | Holwerda | .................... | 181/207 |
| 5,744,763 A * | 4/1998 | Iwasa et al. | .................. | 181/286 |
| 6,007,890 A * | 12/1999 | DeBlander | .................... | 428/72 |
| 6,024,190 A * | 2/2000 | Ritzema | ....................... | 181/286 |
| 6,290,022 B1 * | 9/2001 | Wolf et al. | .................. | 181/292 |
| 6,971,475 B2 * | 12/2005 | Tompson et al. | ............. | 181/290 |
| 7,416,773 B2 * | 8/2008 | Hiyama et al. | .............. | 428/117 |
| 2003/0006090 A1 * | 1/2003 | Reed | .......................... | 181/290 |
| 2003/0096079 A1 * | 5/2003 | Messina et al. | ............... | 428/85 |
| 2003/0178250 A1 * | 9/2003 | Putt et al. | ..................... | 181/290 |
| 2004/0075290 A1 * | 4/2004 | Campbell | .................. | 296/39.3 |
| 2004/0129493 A1 * | 7/2004 | Campbell | ..................... | 181/204 |
| 2005/0006173 A1 * | 1/2005 | Albin, Jr. | ..................... | 181/290 |
| 2006/0272279 A1 * | 12/2006 | Palumbo et al. | ............. | 52/783.1 |

FOREIGN PATENT DOCUMENTS

| | | |
|---|---|---|
| DE | 11 91 597 | 4/1965 |
| DE | 14 22 020 | 11/1969 |
| DE | 100 34 990 A1 | 2/2002 |
| EP | 1 061 190 A1 | 12/2000 |
| EP | 1 382 439 A3 | 2/2004 |
| JP | 06019481 A * | 1/1994 |

* cited by examiner

*Primary Examiner*—Edgardo San Martin
(74) *Attorney, Agent, or Firm*—Maginot, Moore & Beck

(57) ABSTRACT

A description is given of a sandwich structure which comprises a core and outer layers arranged on both sides of the core, in which the core has core clearances which are dimensioned such that the acoustic behavior of the sandwich structure in the region of the core clearances corresponds to the acoustic behavior of a double wall, and at the same time the global acoustic behavior of the sandwich structure is retained.

17 Claims, 3 Drawing Sheets

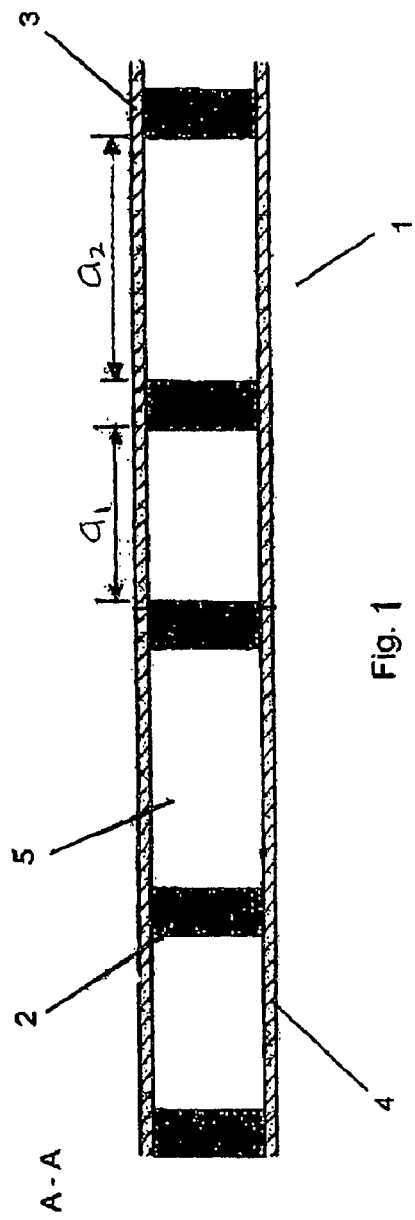
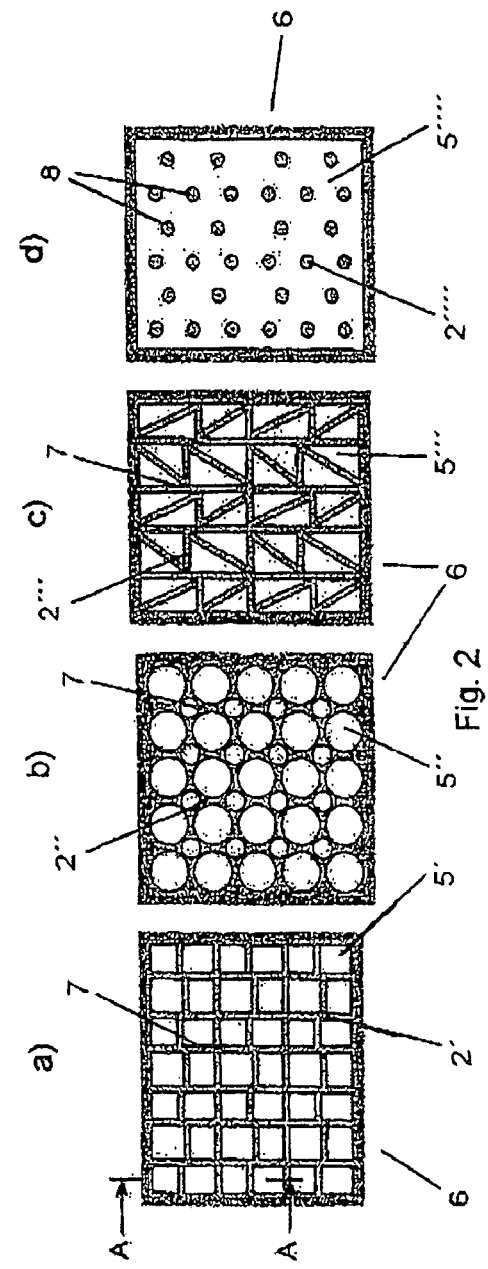
Fig. 1
Fig. 2

SANDWICH STRUCTURE WITH FREQUENCY-SELECTIVE DOUBLE WALL BEHAVIOR

This application claims the benefit of U.S. Provisional Application Ser. No. 60/808,188, filed May 24, 2006, and which is incorporated herein by reference.

TECHNICAL FIELD

The invention relates to a sandwich structure, comprising a core and outer layers arranged on both sides of the core.

PRIOR ART

Greater requirements for the acoustic comfort of passengers in large-capacity aircraft demand better acoustic properties of the cabin wall structure and consequently of the cabin wall elements making up the lining of the cabin. Standard material for these cabin wall elements takes the form of sandwich structures, such as for example sandwich panels with a core of a honeycomb structure.

The structure of a sandwich panel is represented by way of example in FIG. 5. The sandwich panel 100 comprises a three-layer composite construction with outer layers 300, 400 of the thickness $d_1$ and $d_2$ and a supporting core 200 of the height h. A fiber-reinforced composite material is used for example as the outer layer on the upper side 300 and underside 400 of the supporting core 200. The supporting core 200 is formed by a honeycomb of paper impregnated in phenolic resin, which in its appearance resembles a bees' honeycomb. It can be assumed that in the future foams, for example phenolic resin, will be used increasingly as the core material.

A major advantage of sandwich panels is their very high bending resistance together with low weight. In a sandwich panel, tensile and compressive stresses are transferred predominantly through the outer layers, while the core transfers the shear stresses resulting from deformation of the overall structure perpendicularly in relation to the surface of the panel.

In comparison with materials of a homogeneous structure and an identical or comparable weight per unit area, the acoustic properties of sandwich panels with respect to sound transmissions and sound emission are poor, however. For instance, the sound transmission loss above the limiting coincidence frequency that can be achieved with sandwich panels lies significantly below the value for homogeneous materials calculated on the basis of the mass law. By contrast with homogeneous wall structures, in the case of sandwich panels there is a dip in the sound transmission loss in the region of the limiting coincidence frequency in the form of a wide-band plateau. The cause of this behavior is the shearing resistance of the core, which in this frequency range dominates the propagation velocities of the transverse waves within the sandwich panel.

Therefore, one possible way of improving the sound transmission loss of sandwich panels is to keep the propagation velocity of the transverse waves below the velocity of airborne sound by reducing the shearing resistance of the core.

Thus, it is known from DE 100 34 990 A1 and EP 1 382 439 A3 to reduce the shearing resistance of the core of a sandwich panel for example by slitting. As a result, the variation of the sound transmission loss is improved and the sound radiation of the sandwich panel is reduced.

Another possible way of reducing the adverse influence of the coincidence effect on the sound transmission loss is to increase the structure-borne sound insulation of sandwich panels.

A sandwich panel with outer layers arranged on both sides of a core is known from EP 1 061 190 A1. The core itself in this case comprises at least two core layers, the two outermost ones of which are respectively joined to an outer layer. The core layers are spaced apart from one another by means of spacing elements. This sandwich panel represents an improvement in the sound insulation for the area of structural acoustics in comparison with single walls, and a simplified structural design in comparison with conventional double walls, such as for instance plaster board/mineral wool/plaster board walls. The design of the core layers arranged spaced apart from one another is in this case based exclusively on static aspects. In EP 1 061 190 A1, no consideration is given to structural design conditions and acoustic properties of the sandwich panel. Possible ways of avoiding the double-wall resonant frequency of double walls are not proposed.

It is known from Feng, L. "A modified honeycomb panel to increase sound transmission loss"; *Tenth International Congress on Sound and Vibration*, Stockholm 2003; pages 4549-4554, to increase the sound transmission loss of sandwich panels of an aluminum type of construction by locally detaching the adhesive bond between the outer layer of aluminum and the core. As a result, on the basis of the mass law, the sandwich panel behaves acoustically in approximately the same way as a wall of a homogeneous material in the range of the limiting coincidence frequency and in the range of the double-wall resonance. A disadvantage of this is that only partial adhesive attachment of the outer layers to the core of a sandwich panel is unsuitable for use in aircraft construction. In production, an additional separating sheet has to be introduced in the regions that are not to be adhesively attached, and this sheet cannot be removed after production and consequently leads to an increase in the weight of the sandwich panel. In the regions that are not adhesively attached, the core, separating sheet and outer layer rattle, which leads to the individual components becoming damaged and consequently reduces the service life of the sandwich panel.

DE-B 14 22 020 and DE-B 11 91 597 disclose a sandwich structure, comprising a core and outer layers arranged on both sides of the core, the core having regularly arranged core clearances.

TECHNICAL OBJECT OF THE INVENTION

The invention is therefore based on the object of developing a sandwich structure with an improved sound transmission loss.

ADVANTAGES OF THE INVENTION

The object is achieved by a sandwich structure as claimed in claim 1, the core preferably having core clearances arranged directly under one or both outer layers, which clearances are dimensioned such that the acoustic behavior of the sandwich structure in the region of the core clearances locally corresponds to the acoustic behavior of a double wall, and at the same time the global acoustic behavior of the sandwich structure is retained. By appropriate dimensioning and arrangement of the core clearances, the acoustic behavior of the sandwich structure according to the invention in the high-frequency range corresponds to that of a double wall, and in the low-frequency range corresponds to that of a conventional sandwich panel.

In order to achieve this acoustic behavior, the core clearances arranged in the core between the outer layers are on the one hand large enough that the acoustic behavior of the sandwich structure in the region of the core clearances corresponds locally to the acoustic behavior of a double wall, and on the other hand small enough that the global acoustic behavior of the sandwich structure is retained. The core may in this case comprise a honeycomb structure, from which the core clearances are cut out. It is similarly conceivable for the core to consist of a cured foam, for example an expanded synthetic resin, from which the core clearances are cut out, or are left when the foam expands during its production. The core clearances create regions in which the outer layers are supported by the honeycomb structure or the foam of the core and regions in which the outer layers are not supported, or only a little. The sandwich structure may for example be a sandwich panel.

The sandwich structure according to the invention has the advantage over the prior art that in the range of the limiting coincidence frequency it behaves in a way corresponding to a conventionally constructed sandwich panel of identical dimensions, and above the limiting coincidence frequency it behaves acoustically like a double wall and not like a conventional sandwich panel. Below the limiting coincidence frequency, the sandwich structure according to the invention behaves like a conventional sandwich panel. A further advantage of the sandwich structure according to the invention is a weight reduction in comparison with conventional sandwich panels, resulting from the partial removal of the core. A positive side effect is the reduction of the shearing resistance of the core brought about by the core clearances, combined with the positive effects described above that this has on the sound transmission loss.

An advantageous refinement of the invention provides that the core clearances are formed in such a way that at least one outer layer has regions which are not supported by the core. In this case, the core clearances may be formed in such a way that the core is partially complete, or only removed over part of its height, so as to create regions in which both outer layers are not supported by the core or regions in which only one outer layer is not supported by the core. The first natural frequency of the outer layer regions that are not supported by the core in the region of the core clearances is preferably below the limiting coincidence frequency of a sandwich structure of the same dimensions without core clearances, and above the double-wall resonance of the outer layers. In addition, the natural frequencies of neighboring outer layer regions that are not supported by the core are preferably different. In order to avoid interference between neighboring core clearance regions, the ratio of the natural frequencies of neighboring core clearance regions preferably corresponds to a prime number or an irrational number.

Another advantageous refinement of the invention provides that at least one outer layer has different thicknesses in the region of neighboring core clearances. The different thicknesses of the outer layer in the region of neighboring core clearances has the effect of achieving different natural frequencies of the outer layer regions that are not supported by the core in the region of the core clearances.

An additional, advantageous refinement of the invention provides that the outer layers arranged on opposite sides of the core have different thicknesses. By making the outer layers arranged on the opposite sides of the core have different thicknesses, the double-wall resonance can be influenced. A suitable choice of the thicknesses of the outer layers allows the double-wall resonance to be set to the desired frequency. This can similarly be achieved by the outer layers arranged on opposite sides of the core consisting of different materials.

According to a further advantageous refinement of the invention, it is provided that neighboring core clearances have different geometries. As an alternative or in addition, neighboring core clearances may have different dimensions. The core clearances preferably have in plan view geometries that are simple to produce, with for example a rectangular, square, circular or triangular cross section. In this case, the core clearances may extend over the entire height of the core, or they may only take up part of the height of the core. In principle, it is also conceivable for the core clearances to be arranged in such a way that both outer layers have regions in which they are not supported by the core, the core being retained continuously for example in the region of the middle of the height. The core is preferably reduced by the core clearances to a core lattice, at least under one outer layer. If the core clearances extend over the entire height of the core, the core lattice comprises webs connecting the outer layers to one another. In the case of all the embodiments, the core may be produced from a honeycomb structure from which the core clearances are cut out. It is similarly conceivable for the core to be produced from an expanded material.

Further advantageous refinements of the invention are obtained from a combination of the dependent claims and the following description of the exemplary embodiment.

BRIEF DESCRIPTION OF THE DRAWINGS

In the figures:

FIG. 1 shows a schematic representation of the structure of a sandwich structure according to the invention in cross section, FIG. 2 shows a schematic representation of various geometries of core clearances in plan view.

DETAILED EMBODIMENT OF THE INVENTION

Figure 3:
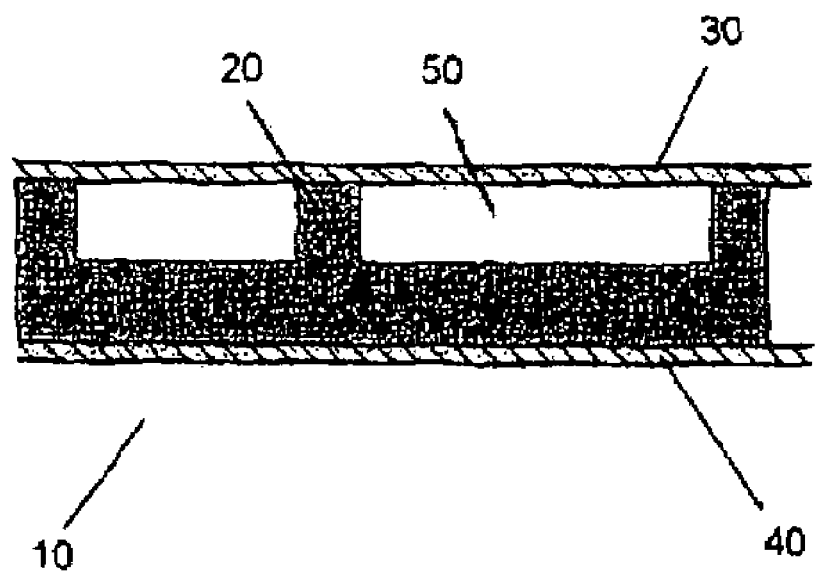
FIG. 3 shows a schematic representation of the structure of a sandwich structure according to the invention in cross section, with core clearances only arranged under one outer layer.
Figure 5:
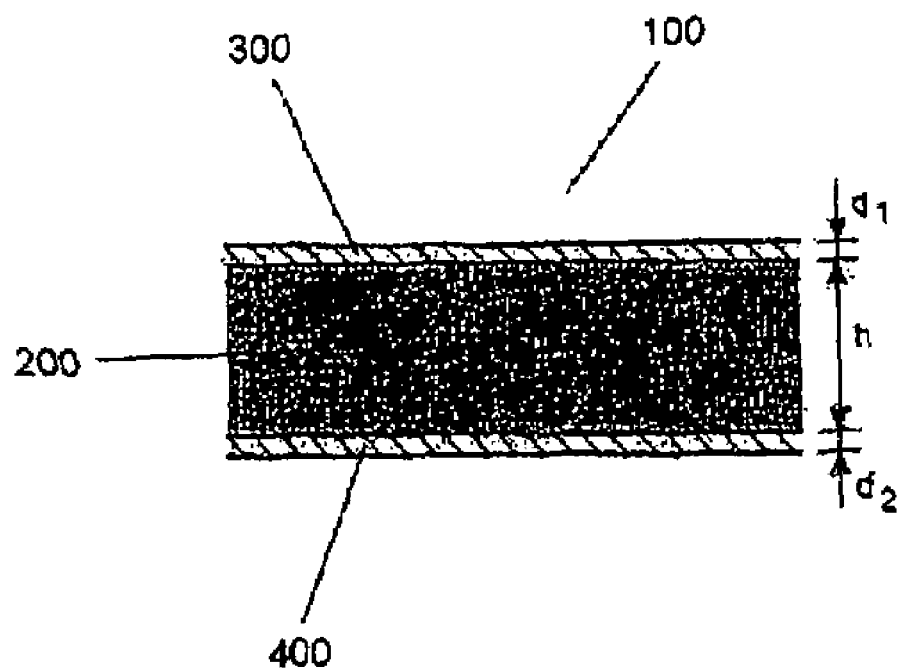
FIG. 5 shows a schematic representation of the structure of a conventional prior-art sandwich panel in cross section.

A sandwich structure 1, represented in FIG. 1, substantially comprises a core 2, two outer layers 3, 4, which are arranged on both sides of the core 2, and core clearances 5, which are arranged in the core 2 and take up the entire height h of the core 2. In the region of the core clearances 5, the outer layers 3, 4 are not supported by the core 2. Depending on how they are viewed, these regions are also referred to as core clearance regions or outer layer regions in which the outer layer 3, 4 is not supported by the core 2. The dimensions $a_1$, $a_2$ of the core clearances 5 are on the one hand dimensioned to be large enough for the acoustic behavior of the sandwich structure 1 in the region of the core clearances 5 to correspond locally to the acoustic behavior of a double wall, and are on the other hand dimensioned to be small enough for the global acoustic behavior of the sandwich structure 1 to be retained. The core 2 in this case comprises a honeycomb structure, from which the core clearances 5 are cut out. In principle, it is also conceivable for the core 2 to be produced from a cured foam, for example from an expanded synthetic resin. FIG. 1 shows a cross section along the line A-A through the core 2' of a sandwich structure 1 that is represented in plan view in FIG. 2a), in the case of which the core clearances 5' have a rectangular geometry. The dimensions $a_1$, $a_2$ of neighboring core clearances 5 of the same geometry differ from one another, in order to avoid interference between the natural frequencies of the regions of the outer layers 3, 4 that are not supported by the core 2.

In the case of the sandwich structures 1', 1", 1''' 1'''' that are represented in FIG. 2, the core clearances 5', 5", 5''', 5'''' once again take up the entire height h of the core 2', 2", 2''', 2'''', so that there only remains a core lattice 6, which is shown in principle for various geometries of the core clearances 5', 5", 5''', 5'''' and comprises the webs 7 connecting the outer layers to one another. Thus, the core clearances 5' in FIG. 2a) have a rectangular geometry in plan view. In FIG. 2b), the core clearances 5" have a circular geometry. Circular core clearances 5" can be cut out particularly easily from the core 2", for example by means of a hole saw. In FIG. 2b), diagonally neighboring core clearances 5" have different dimensions. In FIG. 2c), a core 2''' with triangular core clearances 5''' is represented. Neighboring, triangular core clearances 5''' are arranged in different directions, have different dimensions, or both. In FIG. 2d), the core clearances 5'''' arranged in the core 2'''' are dimensioned such that all that remains of the core 2'''' are columns 8 forming the core lattice 6 and connecting the outer layers to one another. The columns 8 are preferably irregularly arranged, in order to avoid interference between the natural frequencies of the regions of the outer layers that are not supported by the core 2''''.

In the case of the sandwich structure 10 represented in FIG. 3, the core clearances 50 take up only part of the height h of the core 20, so that the core 20 is partially removed only under one outer layer 30. As a result, one outer layer 30 has regions which are not supported by the core 20, whereas the other outer layer 40 is completely supported by the core 20. In principle, the same geometries as are represented in FIG. 2 are conceivable for the core clearances 50.

Figure 4:
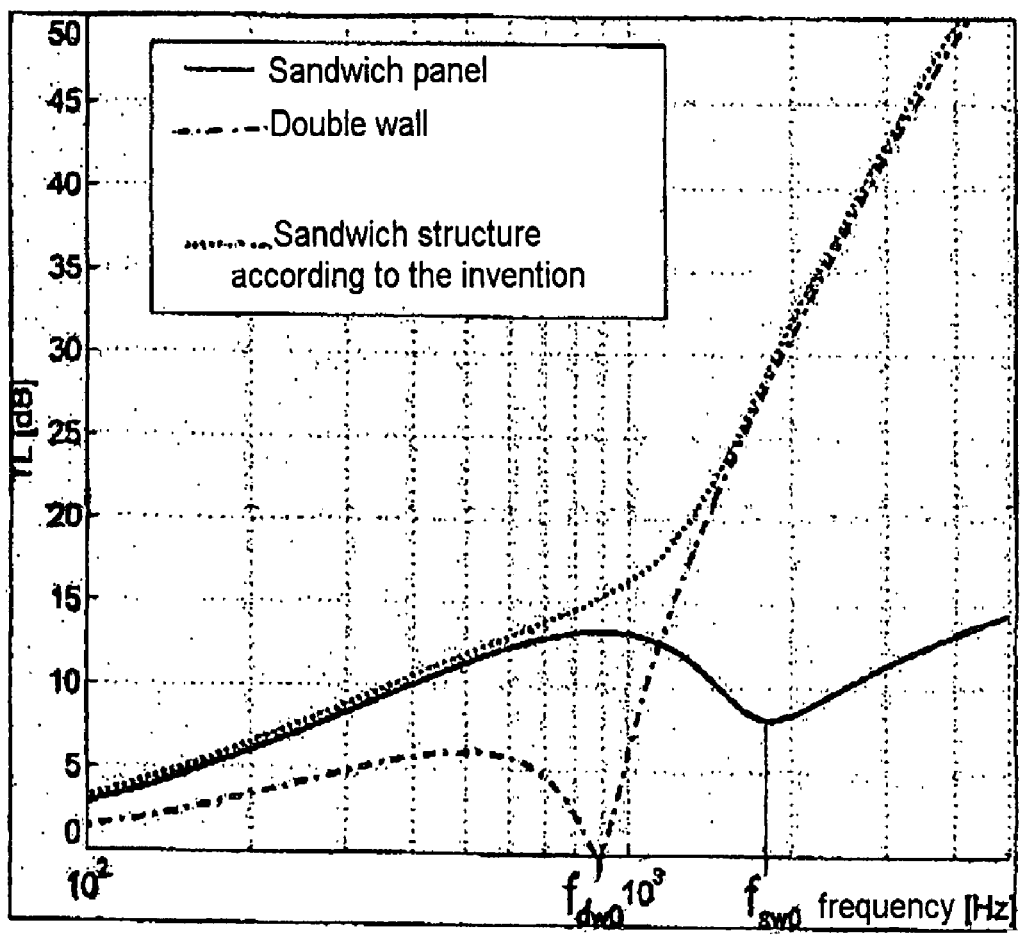
FIG. 4 shows a representation of the variation of the sound transmission loss of a sandwich structure according to the invention, of a double wall and of a conventional sandwich panel with the same dimensions and the same weight per unit area.

The diagram represented in FIG. 4 shows the variation of the sound transmission loss TL over the frequency for a sandwich structure according to the invention, a double wall and a conventional sandwich panel. In this case, the sandwich structure according to the invention, the double wall and the conventional sandwich panel have the same dimensions with respect to the distance of the outer layers from one another, and the same weight per unit area.

The suitably dimensioned core clearances produce a frequency-dependent behavior of the sound transmission loss TL of the sandwich structure according to the invention, which corresponds both to that of a sandwich panel or a single wall and to that of a double wall. In the low-frequency range, the behavior corresponds largely to that of the conventional sandwich panel or single wall. In the high-frequency range, the behavior corresponds to that of the double wall. The acoustic behavior of the sandwich structure is influenced by the core clearances in such a way that the behavior known from the prior art of the propagation velocity of the transverse waves over the frequency is eliminated. As a result, in the case of the sandwich structure according to the invention, the coincidence of the transverse waves with the surrounding air is completely avoided, and so too is the formation of a plateau-like coincidence dip in the sound transmission loss TL.

In order to achieve the frequency-selective double wall behavior of the sandwich structure according to the invention that is described and shown in FIG. 4, and thereby achieve the elimination of the coincidence of the conventional sandwich panel (i.e. one which does not have any core clearances), knowledge of the limiting coincidence frequency $f_{sw0}$ of a comparable conventional sandwich panel of identical dimensions and materials for the outer layers and the supporting core is necessary for the design of the core clearance.

The dimensions of the core clearances, such as for example the dimensions $a_1$ and $a_2$ that are shown FIG. 1, are subsequently to be chosen such that, below the limiting coincidence frequency $f_{sw0}$, the outer layer regions that are not supported by the core have a first natural frequency $f_{e1}$. In this case, the sandwich structure according to the invention no longer acts globally as an overall structure but locally as a double wall. On the other hand, the clearances are chosen to be so small that, in the range of double wall resonance $f_{dw0}$, the global behavior of a conventional sandwich panel is still obtained, and no deterioration in the sound transmission loss occurs here. This means that the first natural frequency $f_{e1}$ of the free outer layer regions must lie above the double wall resonance $f_{dw0}$. Altogether, the following must therefore apply $$f_{dw0} < f_{e1} < f_{sw0}.$$

As a result, the positive acoustic properties of the sandwich panel can be retained for the sandwich structure according to the invention in the low-frequency range. At high-frequency, the sandwich structure according to the invention behaves acoustically like a double wall (FIG. 4).

To sum up, an increase in the sound transmission loss is achieved together with a simultaneous weight reduction.

It is particularly emphasized that the limiting coincidence frequencies of the individual outer layers considered on their own lie significantly above the frequency range that is relevant for acoustic comfort for the materials that are typically used in aircraft construction. An occurrence of undesired cavity resonances in the core clearance regions in which the outer layer is not supported by the core is likewise only to be expected above the frequency range that is relevant for acoustic comfort. Furthermore, the core lattice, or the core remaining between the outer layers, acts like a compartmentalization of a double wall cavity. This likewise has positive effects on the sound transmission loss. Something that has to be avoided is tuning of the regions of the outer layers that are not supported by the core to the same natural frequency. In this case, the overall structure would act at the corresponding frequency like a panel made up of individual emitters. The clearances should therefore have different geometries and/or dimensions. As an alternative or in addition to this, different outer layer thicknesses and materials may be chosen. Partial removal of the core under only one outer layer, represented in FIG. 3, also leads to the desired different outer layer properties.

It is easily possible for the invention to be put into mass production, since the corresponding regions of the core merely have to be removed before the core and the outer layers are joined together. The further production procedure is not adversely affected. Since no new or additional materials are required, no approval on the part of the competent authorities in this respect is required either.

INDUSTRIAL APPLICABILITY

The invention can be industrially applied in particular, but not exclusively, in the area of the production of sandwich structures for use in aircraft construction.

LIST OF DESIGNATIONS

| | |
|---|---|
| 1 | sandwich structure |
| 2, 2', 2", 2''', 2'''' | core |
| 3 | outer layer |
| 4 | outer layer |
| 5, 5', 5", 5''', 5'''' | core clearance |
| 6 | core lattice |
| 7 | web |
| 8 | column |

-continued

| | |
|---|---|
| 10 | sandwich structure |
| 20 | core |
| 30 | outer layer |
| 40 | outer layer |
| 50 | core clearance |
| 100 | sandwich panel |
| 200 | supporting core |
| 300 | outer layer |
| 400 | outer layer |
| d | thickness of the outer layer |
| h | height of the core |
| $a_1$ | dimension of a core clearance |
| $a_2$ | dimension of a core clearance |

The invention claimed is:

1. A sandwich structure, comprising a core and outer layers arranged on both sides of the core, the core having core clearances which are dimensioned such that the acoustic behavior of the sandwich structure in the region of the core clearances corresponds to the acoustic behavior of a double wall, and at the same time the global acoustic behavior of the sandwich structure is retained, and and which are dimensioned such that the acoustic behavior of the sandwich structure in the low-frequency range corresponds to that of a corresponding sandwich structure of the same dimensions without core clearances and in the high-frequency range corresponds to that of a double wall;
wherein the natural frequencies of neighboring outer layer regions that are not supported by the core are different; and
wherein the ratio of the natural frequencies of neighboring core clearance regions correspond to a prime number so as to avoid interferences between neighboring core clearance regions.

2. The sandwich structure as claimed in claim 1, the core clearances being formed in such a way that at least one outer layer has regions which are not supported by the core.

3. The sandwich structure as claimed in claim 2, the first natural frequency of the outer layer regions that are not supported by the core in the region of the core clearances being below a limiting coincidence frequency of a sandwich structure of the same dimensions without core clearances, and above the double-wall resonance of the outer layers.

4. The sandwich structure as claimed in claim 1, at least one outer layer having different thicknesses (d) in the region of neighboring core clearances.

5. The sandwich structure as claimed in claim 1, the outer layers arranged on opposite sides of the core having different thicknesses (d).

6. The sandwich structure as claimed in claim 1, the outer layers arranged on opposite sides of the core are formed of different materials.

7. The sandwich structure as claimed in claim 1, the core clearances having the effect that the core is partially removed only under one outer layer, so that one outer layer has regions which are not supported by the core, and the outer layer is completely supported by the core.

8. The sandwich structure as claimed in claim 1, the core being produced from a honeycomb structure.

9. The sandwich structure as in any of claims 1-3, 4 or 5 the core being produced from an expanded material.

10. The sandwich structure as claimed in claim 1, neighboring core clearances having different geometries.

11. The sandwich structure as claimed in claim 1, neighboring core clearances having different dimensions.

12. The sandwich structure as claimed in claim 1, the core clearances having a rectangular or square cross section.

13. The sandwich structure as claimed in claim 1, the core clearances having a circular cross section.

14. The sandwich structure as claimed in claim 1, the core clearances having a triangular cross section.

15. The sandwich structure as claimed in claim 1, the core clearances taking up only part of the height (h) of the core.

16. The sandwich structure as claimed in claim 1, the core being reduced to a core lattice, at least under one outer layer.

17. The sandwich structure as claimed in claim 16, the core lattice comprising webs connecting the outer layers to one another.

* * * * *